UNITED STATES PATENT OFFICE.

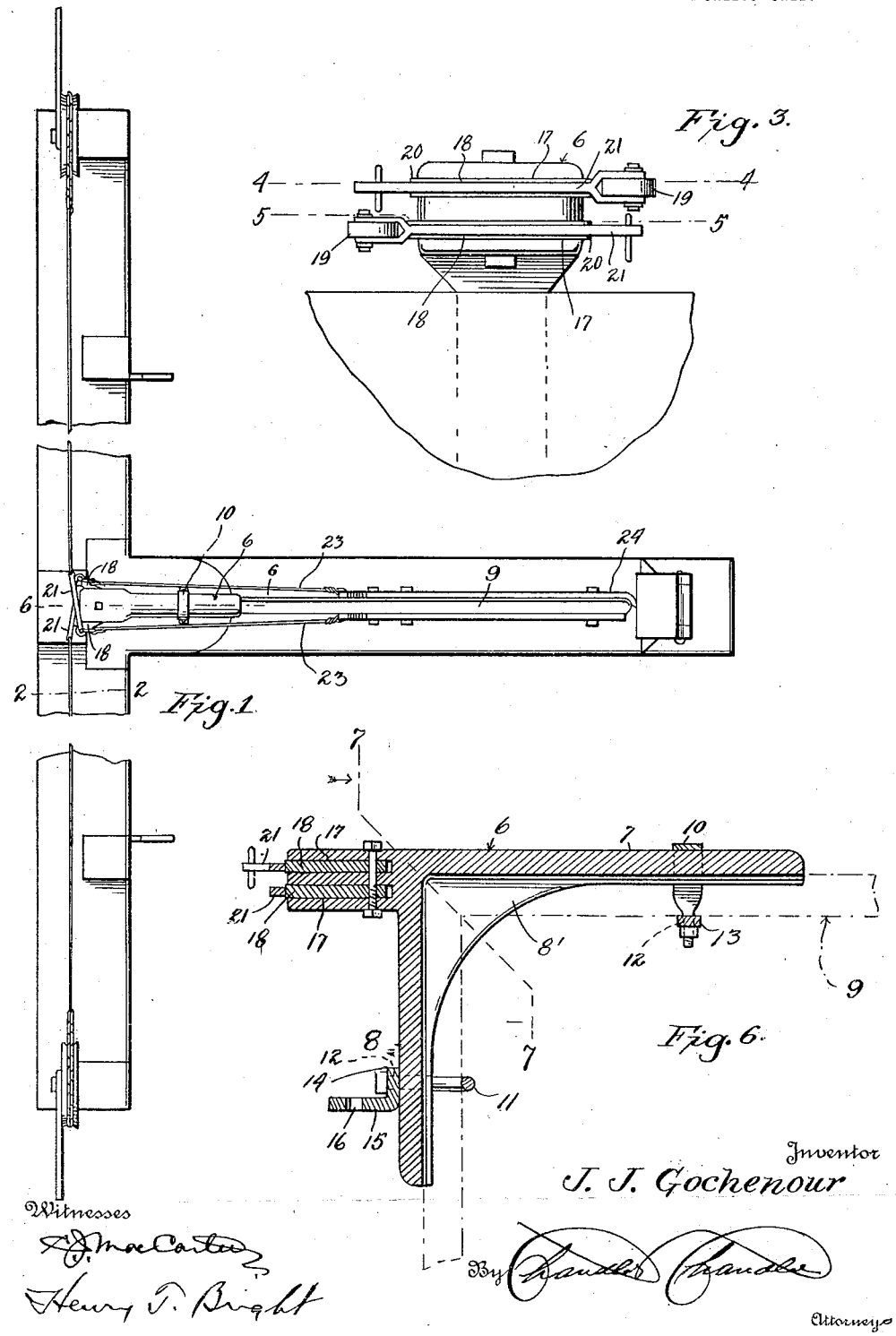

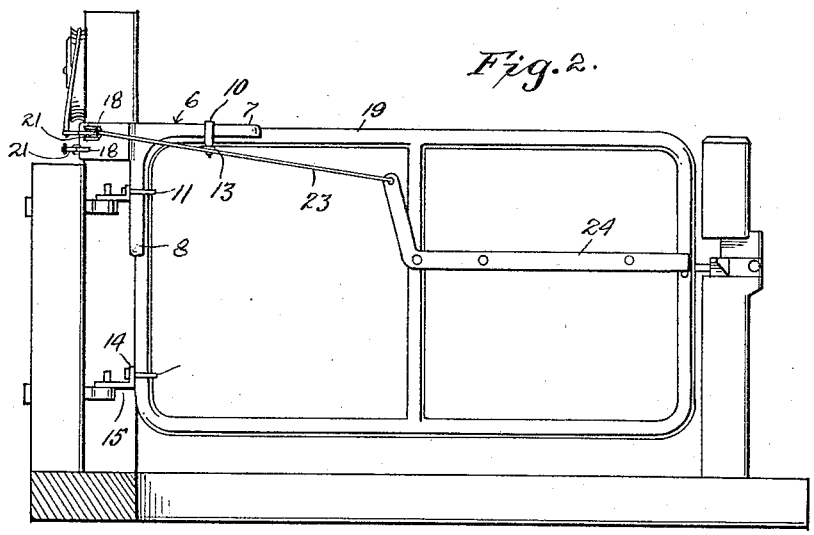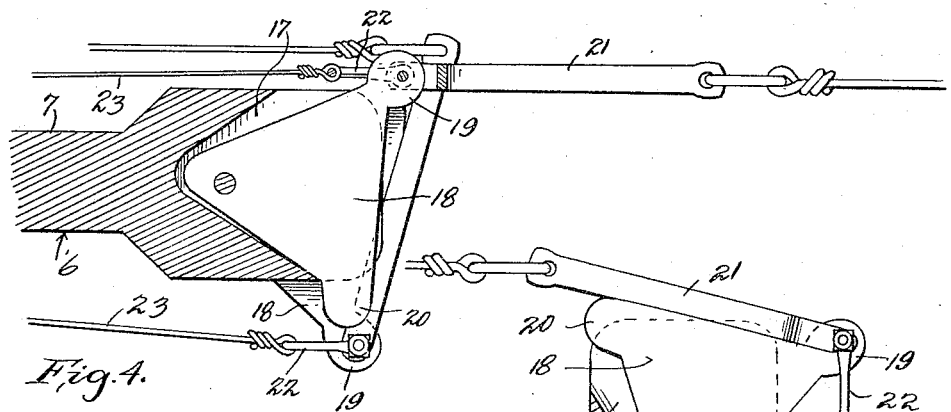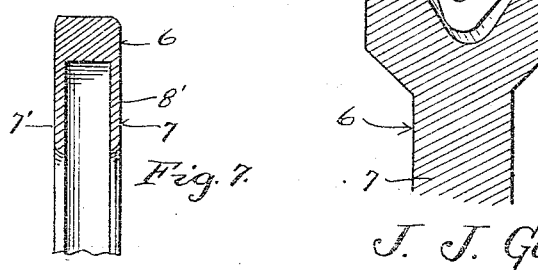

JOHN J. GOCHENOUR, OF MAURERTOWN, VIRGINIA.

GATE-OPENING ATTACHMENT.

1,194,993.  Specification of Letters Patent.  Patented Aug. 15, 1916.

Application filed September 2, 1915. Serial No. 48,689.

*To all whom it may concern:*

Be it known that I, JOHN J. GOCHENOUR, a citizen of the United States, residing at Maurertown, in the county of Shenandoah, State of Virginia, have invented certain new and useful Improvements in Gate-Opening Attachments; and I do hereby declare the following to be a full, clear, and exact description of the invention, such as will enable others skilled in the art to which it appertains to make and use the same.

This invention relates to gate opening attachments, and has for its object to provide a device which may be attached to farm gates already in use, and by means of which the gate may be readily opened and prevented from sagging during operation. It is designed as an improvement of the structure shown in my issued Patent No. 1,066,404.

A particular object of the invention is to provide a device embodying the features of my issued patent, with certain mechanical improvements, which may be easily and quickly attached to gates, and in which a portion of the attaching means will form one of the hinge eyes.

Another object is to provide a structure in which the pull cords will be prevented from abrading themselves against the metal parts of the device.

In the drawings: Figure 1 is a top plan view of a gate constructed in accordance with the invention; Fig. 2, a section on the line 2—2 of Fig. 1; Fig. 3, a side view of a fragment of what is shown in Fig. 1; Fig. 4, a section on the line 4—4 of Fig. 3 with the gate in open position; Fig. 5, a section on the line 5—5 of Fig. 3 with the gate closed; Fig. 6, a section on the line 6—6 of Fig. 1, and Fig. 7, a section on the line 7—7 of Fig. 6.

Referring to the drawings: The present invention consists of an angular body 6, including the two members 7 and 8, extending at right angles to each other. The adjacent faces of these members are channeled, as shown, to receive the gate frame 9 the two channels meeting at a square corner, so as to accommodate either a square or round cornered frame. To further accommodate a square or round cornered frame the mutual end of the channels of the members 7 and 8 has its walls extended as at 7' and 8' whereby the head is greatly strengthened at the point of the greatest strain. The edges of the extended walls 7' and 8' are preferably curbed although they may be made straight and still obtain the twofold advantage of strengthening the head and enabling the use of either a square or round cornered frame. The members 7 and 8 are attached to the frame by means of yokes 10 and 11, respectively, engaged around the frame, and extending beyond the members, their extended ends being engaged through openings 12 in cross pieces 13 and 14 respectively. The cross piece 14 has a downwardly and laterally extending flange 15 which is provided with an eye 16 to receive one of the gate pintles, this element 14 thus performing a double function.

At the upper end of the attachment, there is a rearwardly extending head having two V-shaped recesses 17 formed in its rear face, one above the other, their major ends opening through the rearward face of the head. In each of the recesses, there is pivoted a triangular lever 18, its pivot being adjacent to its apex, which lies in the apex of the respective recess, but the pivot point is slightly off center, as will be seen, to prevent the lever from hitting a dead center during operation, as will be understood. Each of the levers 18 has an outwardly and rearwardly extended finger at one of its rear corners, indicated at 19, these fingers being on the opposite corners of the levers with respect to each other, and on the other corner of each lever, there is an outwardly but not rearwardly extending finger 20, the rear faces of which lie flush with the rear faces of the levers. Pivoted to each of the fingers 19, there is an arm 21, these arms being adapted to lie against the rear faces of the levers, and to extend beyond the fingers 20, as will be seen, the two arms 21 thus extending oppositely and lying with their free ends beyond the ends of the fingers 20. To these free ends are attached the usual pull cords of the gate, as shown. The ends of the arms which are pivoted to the fingers 19, have yokes 22 attached thereto, and these yokes receive the latch cords 23, leading to the gate latch indicated at 24.

In operation, it will be noted that when one of the pull cords is operated, the attached arm will be brought against the rear face of its lever 18, and that the latter will be rocked upon its pivot, thus releasing the latch of the gate. Further pull upon the cord will swing the gate in the usual manner. The fact that the arms 21 rest against the rear faces of the levers 20, prevents abrasion of the cords by the levers.

What I claim is:

1. An opening attachment for gates comprising a head, a forwardly extending member carried by the head, a downwardly extending member carried by the head and lying at right angles to the forwardly extending member, the adjacent faces of the two members being channeled to receive a gate frame, detachable yokes engaged with the members and arranged for engagement around a gate frame to hold the members thereto and operating mechanism carried by the head.

2. A gate opening attachment comprising a body including two members extending at right angles to each other and channeled at their adjacent faces to receive a gate frame, said channels meeting at a sharp angle, operating mechanism carried by the body, and means for attaching the body to a gate frame, said attaching means including an element adapted to form a hinge eye.

3. In a gate operating mechanism, the combination with a head adapted for attachment to a gate, said head having V-shaped recesses in its rearward face, of V-shaped levers mounted one in each recess and projecting at their major ends beyond the head, an arm for one of the levers, pivoted to one corner thereof and extending along the rear face of the lever, a second arm for the other lever pivoted to the opposite corner of said lever and extending along the rear face thereof, and means carried by the pivoted ends of the arms for the attachment of latch cords thereto, the free ends of the levers being adapted to receive the pull cords of the gate.

4. The combination with a farm gate, of an opening attachment therefor, said attachment comprising a body including two members extending at right angles to each other, said members being channeled to receive the gate frame, yokes engaged around the gate frame and around the members, cross pieces engaged with the ends of the yokes, one of said cross pieces carrying a flange provided with a hinge eye, and operating mechanism carried by the body.

5. An opening attachment for gates comprising a head, a forwardly extending member carried by the head, a downwardly extending member carried by the head at the forward end of the head and lying at right angles to the forwardly extending member, the adjacent faces of the two members being channeled to receive the corner of a gate frame, said head having V-shaped recesses in its rearward face at different elevations, V-shaped levers mounted one in each of the recesses and projecting at their major ends beyond the rearward face of the head, each of said levers having an outwardly and rearwardly extending finger at one rear corner, said fingers being located oppositely with respect to each other, an arm pivoted to each of the fingers and arranged for movement to rest against the rearward face of its respective lever, and yokes pivotally connected with the attached ends of the arms for the reception of latch cords, the free ends of the arms being adapted for the attachment of pull cords thereto.

In testimony whereof, I affix my signature, in the presence of two witnesses.

JOHN J. GOCHENOUR.

Witnesses:
J. L. FELLER,
M. DONALDSON.